United States Patent
Hama et al.

(10) Patent No.: US 10,726,282 B2
(45) Date of Patent: Jul. 28, 2020

(54) BIOMETRIC AUTHENTICATION APPARATUS, BIOMETRIC AUTHENTICATION SYSTEM AND BIOMETRIC AUTHENTICATION METHOD

(71) Applicant: FUJITSU LIMITED, Kawasaki-shi, Kanagawa (JP)

(72) Inventors: Soichi Hama, Atsugi (JP); Yukihiro Abiko, Kawasaki (JP); Satoshi Maeda, Atsugi (JP); Satoshi Semba, Kawasaki (JP); Hajime Nada, Kawasaki (JP)

(73) Assignee: FUJITSU LIMTITED, Kawasaki (JP)

( * ) Notice: Subject to any disclaimer, the term of this patent is extended or adjusted under 35 U.S.C. 154(b) by 65 days.

(21) Appl. No.: 15/840,212

(22) Filed: Dec. 13, 2017

(65) Prior Publication Data
US 2018/0173976 A1  Jun. 21, 2018

(30) Foreign Application Priority Data
Dec. 20, 2016  (JP) .................................. 2016-246940

(51) Int. Cl.
*G06K 9/00* (2006.01)
*G06K 9/62* (2006.01)
(Continued)

(52) U.S. Cl.
CPC ......... *G06K 9/00885* (2013.01); *G06F 21/32* (2013.01); *G06F 21/83* (2013.01);
(Continued)

(58) Field of Classification Search
None
See application file for complete search history.

(56) References Cited

U.S. PATENT DOCUMENTS

2009/0036783 A1  2/2009  Kishima
2015/0062319 A1  3/2015  Higuchi
(Continued)

FOREIGN PATENT DOCUMENTS

JP  2002-010030  1/2002
JP  2003-187230  7/2003
(Continued)

OTHER PUBLICATIONS

Partial European Search Report dated May 8, 2018 for corresponding European Patent Application No. 17206634.2, 14 pages.
(Continued)

*Primary Examiner* — Delomia L Gilliard
(74) *Attorney, Agent, or Firm* — Fujitsu Patent Center

(57) ABSTRACT

A processor obtains characteristics information of a biometric image captured while casting first or second illumination light onto an authentication target. The first illumination light includes light of a first wavelength, and the second illumination light includes light of the first wavelength and light of a second wavelength. The processor reads characteristics information of a biometric image captured while casting illumination light cast onto the authentication target from a memory that stores first characteristics information of a first biometric image and second characteristics information of a second biometric image. The first biometric image is captured while casting the first illumination light onto a registration target, and the second biometric image is captured while casting the second illumination light onto the registration target. The processor calculates a similarity between the obtained characteristics information and the characteristics information read from the memory, and conducts authentication.

12 Claims, 16 Drawing Sheets

(51) Int. Cl.
*G06F 21/32* (2013.01)
*G06K 9/20* (2006.01)
*G06F 21/83* (2013.01)

(52) U.S. Cl.
CPC ......... *G06K 9/2018* (2013.01); *G06K 9/6215* (2013.01); *G06K 2009/00932* (2013.01); *G06K 2209/21* (2013.01)

(56) References Cited

U.S. PATENT DOCUMENTS

2017/0323167 A1* 11/2017 Mapen ................ G06K 9/4661
2017/0337414 A1* 11/2017 Ohno ................ A61B 5/02416

FOREIGN PATENT DOCUMENTS

JP 2009-238005 10/2009
WO 2013-146761 10/2013

OTHER PUBLICATIONS

Zhang, David et al., "An Online System of Multispectral Palmprint Verification", IEEE Transactions on Instrumentation and Measurement, IEEE Service Center, Piscataway, NJ, US, vol. 59, No. 2, Feb. 1, 2010, pp. 480-490, XP011296447.

* cited by examiner

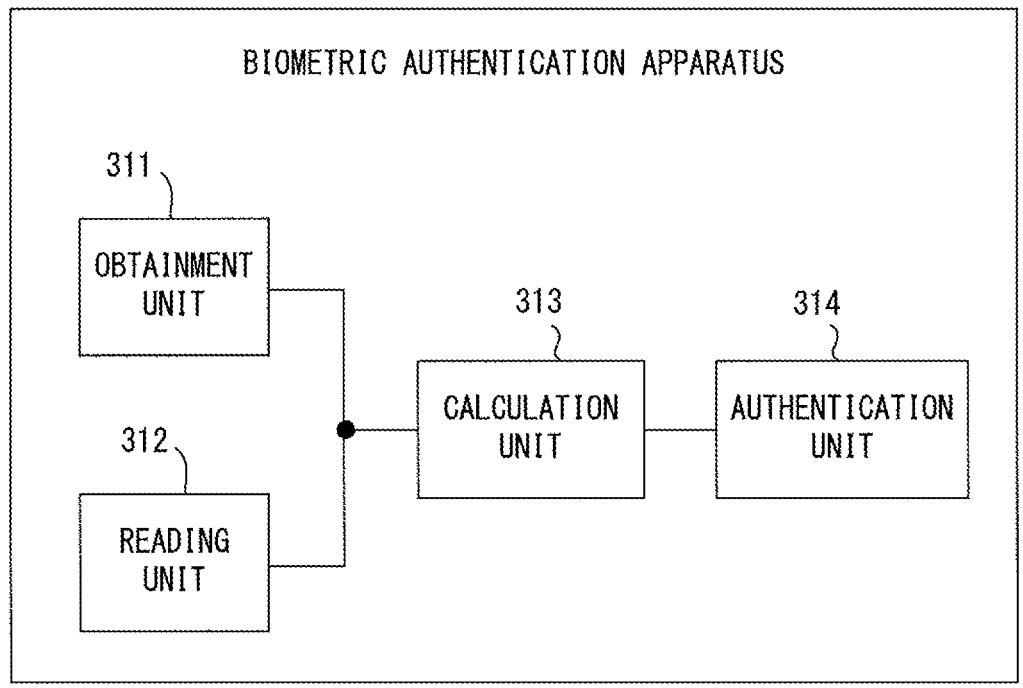
F I G. 3

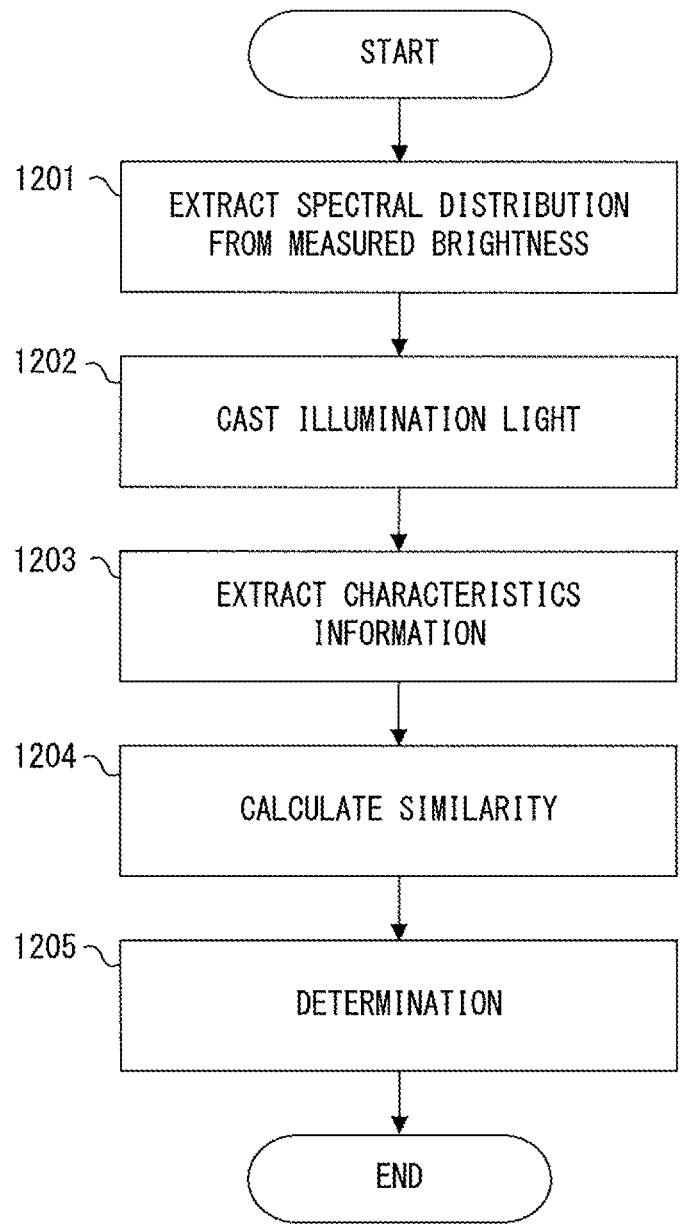
F I G. 1 2

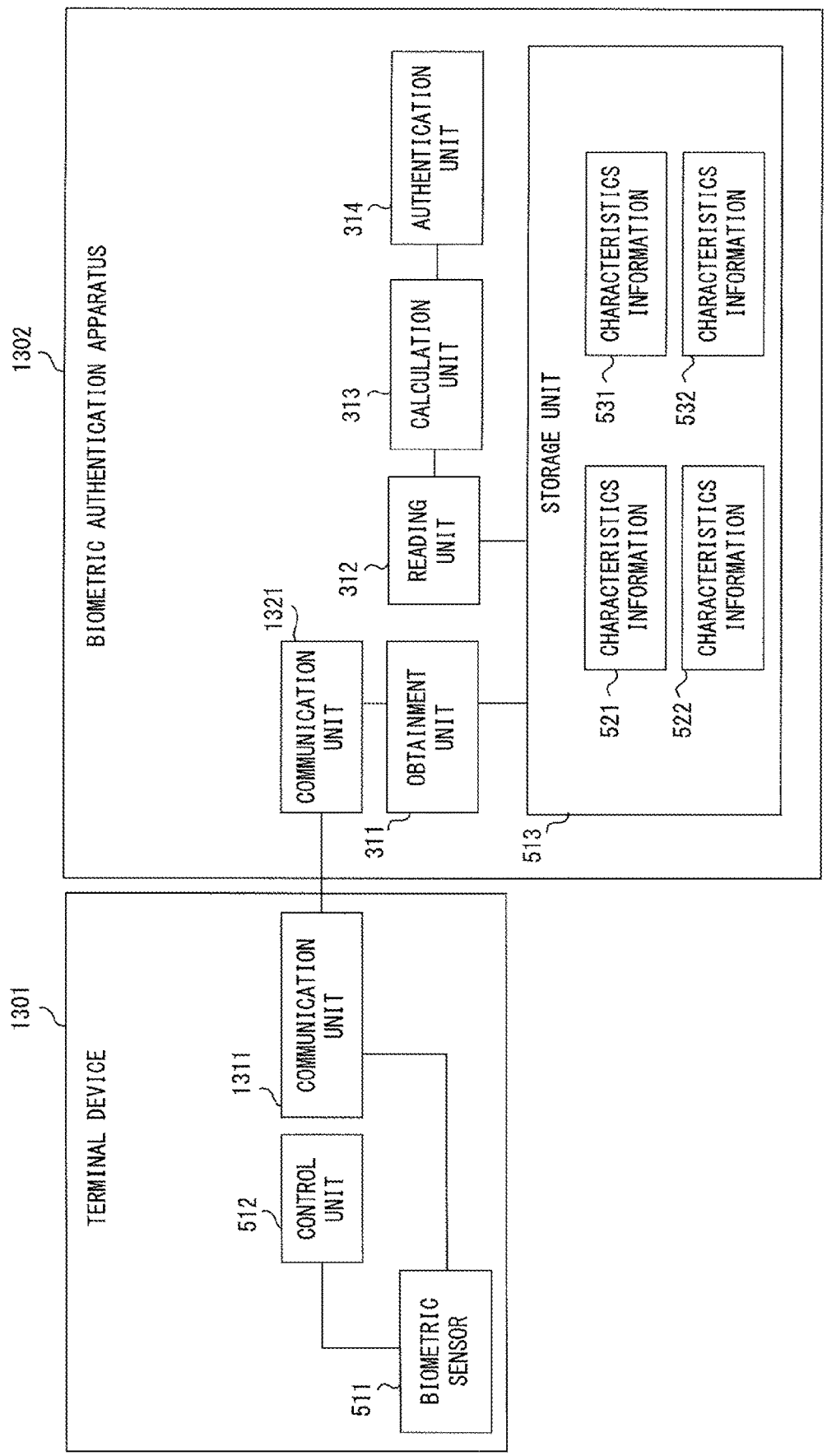
F I G. 13

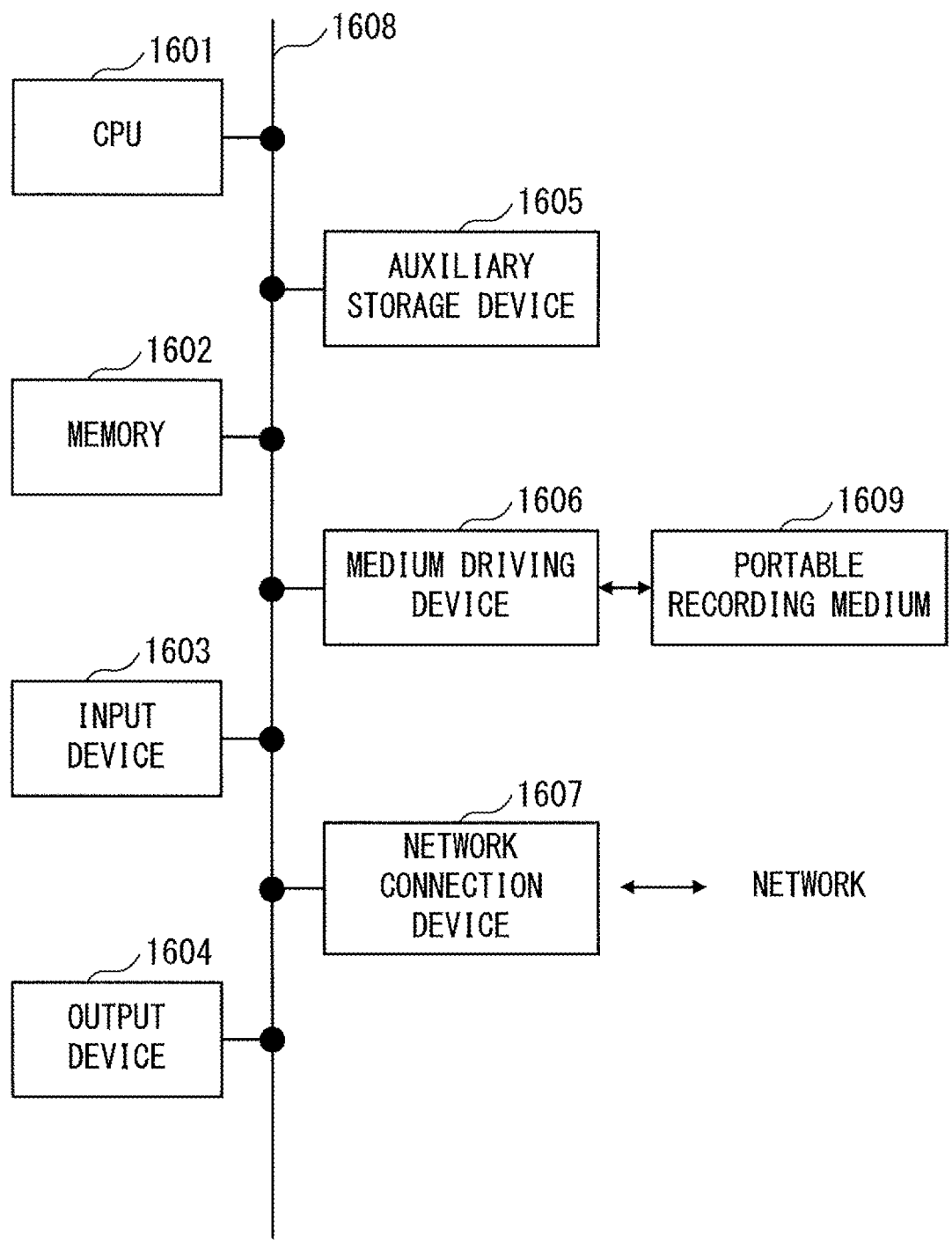
F I G. 1 6

BIOMETRIC AUTHENTICATION APPARATUS, BIOMETRIC AUTHENTICATION SYSTEM AND BIOMETRIC AUTHENTICATION METHOD

CROSS-REFERENCE TO RELATED APPLICATION

This application is based upon and claims the benefit of priority of the prior Japanese Patent Application No. 2016-246940, filed on Dec. 20, 2016, the entire contents of which are incorporated herein by reference.

FIELD

The embodiments discussed herein are related to a biometric authentication apparatus, a biometric authentication system and a biometric authentication method.

BACKGROUND

Biometric authentication technology is technology that performs personal identification by using biometric characteristics such as fingerprints, palm prints, palm shapes, veins, faces, etc. When personal identification is conducted, biometric characteristic obtained from a living body that is an authentication target is compared (checked) with biometric characteristics that are registered in advance, and authentication for the living body that is the authentication target is conducted on the basis of the similarity between them.

Vein authentication for example is a biometric authentication technique based on biometric characteristics obtained by capturing images of vein patterns under the skin. Because vein patterns are bodies' internal information, vein authentication has a feature of higher safety than biometric authentication based on finger prints, palm prints, palm shapes, faces, etc., which are information on bodies' surfaces. When vein authentication is conducted, illumination light is cast onto a living body and an image of a vein pattern is captured.

Biometric authentication techniques using visible light and near-infrared light as illumination light are also known (see Patent Documents 1 and 2 for example). Techniques of removing the influence of external light from captured images are also known (see Patent Documents 3 and 4 for example).

Patent Document 1: International Publication Pamphlet No. WO 2013/146761
Patent Document 2: Japanese Laid-open Patent Publication No. 2009-238005
Patent Document 3: Japanese Laid-open Patent Publication No. 2002-10030
Patent Document 4: Japanese Laid-open Patent Publication No. 2003-187230

SUMMARY

According to an aspect of the embodiments, a biometric authentication apparatus includes a memory and a processor coupled to the memory. The memory stores first characteristics information of a first biometric image and second characteristics information of a second biometric image. The first biometric image is a biometric image captured while casting first illumination light onto a living body that is a registration target, and the second biometric image is a biometric image captured while casting second illumination light onto the living body that is the registration target. The first illumination light includes light of a first wavelength, and the second illumination light includes light of the first wavelength and light of a second wavelength different from the first wavelength.

The processor obtains characteristics information of a biometric image captured while casting the first illumination light or the second illumination light onto a living body that is an authentication target. The processor reads characteristics information of a biometric image captured while casting illumination light cast onto the living body that is the authentication target from the memory. The processor calculates a similarity between the obtained characteristics information and the characteristics information read from the memory and conducts authentication of the living body that is the authentication target on the basis of the similarity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a functional configuration diagram of a biometric authentication apparatus;
FIG. 12 is a flowchart illustrating a third specific example of the biometric authentication process;
FIG. 13 is a functional configuration diagram of a first biometric authentication system;
FIG. 16 is a configuration diagram of an information processing apparatus.

DESCRIPTION OF EMBODIMENTS

Figures 1A, 1B, 1C:
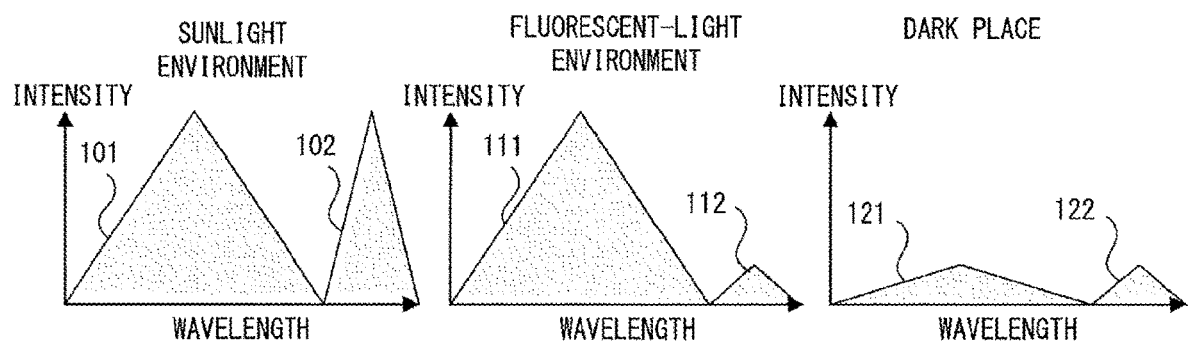
FIG. 1A through FIG. 1C illustrate spectral distributions of external light.

Hereinafter, the embodiments will be explained in detail by referring to the drawings.

When a biometric image such as of a vein pattern etc. is captured while casting illumination light onto a living body, ambient light (external light) existing in the environment in which an image capturing device is used may influence the images to be captured. When a captured image of a living body that is an authentication target is influenced by external light, the similarity between the biometric characteristic obtained from the captured image and the registered biometric characteristic is reduced, leading to a high possibility that the authentication will fail even when the person is a registered person.

Note that this problem arises not only in a case of conducting biometric authentication by using a vein pattern but also in a case of conducting biometric authentication by using other types of biometric characteristics.

Patent documents 3 or 4 above disclose a technique of removing an influence of external light from captured images in an environment with external light. In this technique, an illumination-OFF image is obtained by capturing an image of the subject with the light source tuned off and an illumination-ON image is obtained by capturing an image of the subject with the light source turned on. Then, for each pixel in the illumination-ON image, the difference in brightness value is obtained between the illumination-ON image and the illumination-OFF image, and thereby an image from which the influence of the external light has been removed is generated.

However, when light of a plurality of wavelengths is used as illumination light such as in a case of visible light and near-infrared light, the image capturing device receives light of a wide band including the wavelengths of such types of light. For example, when such an image capturing device is mounted on a mobile terminal device such as a tablet etc. and is used in the open air under the sunlight, the ratio of the intensity of the external light to the intensity of the illumination light becomes much higher. This results in almost no difference between an illumination-ON image and an illumination-OFF image, making it difficult to remove the influence of external light in a method in which differences in brightness values are obtained.

In view of this, a method may be conceivable in which the environment at the time of the registration is reproduced in order to increase the authentication accuracy by using, in accordance with the environment in which the image capturing device is used, illumination light compensating for light of wavelength components that are insufficient in intensity instead of removing an influence of external light through obtained differences in brightness values.

FIG. 1A through FIG. 1C illustrate examples of spectral distributions of external light in various environments. In these examples, the intensity distributions of wavelength components of external light are schematically illustrated for each visible light component and each near-infrared light component. FIG. 1A illustrates an example of a spectral distribution in a sunlight environment in the open air. In a sunlight environment, wavelength components ranging from those of ultraviolet light, which has short wavelengths, to infrared light, which has long wavelengths, exist with almost constant intensities, and thus visible light 101 and a near-infrared light 102 both have high intensities.

FIG. 1B illustrates an example of a spectral distribution in an indoor fluorescent-light environment. Fluorescent light contains a very small wavelength component of near-infrared light, and thus the intensity of visible light 111 is high and an intensity of a near-infrared light 112 is low. FIG. 1C illustrates an example of a spectral distribution in a dark place. In a dark place, illumination light does not exist, leading to very low intensities of visible light 121 and a near-infrared light 122.

Figures 2A, 2B, 2C:
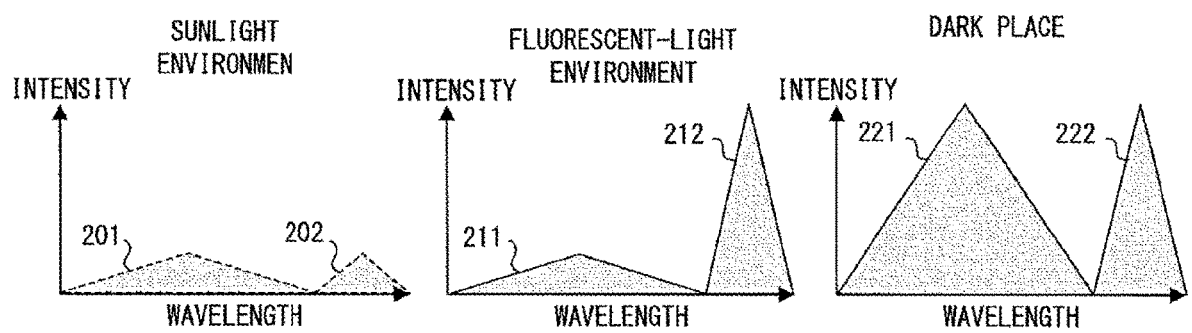
FIG. 2A through FIG. 2C illustrate spectral distributions of illumination light.

FIG. 2A through FIG. 2C illustrate examples of spectral distributions of illumination light that compensates for light of wavelength components having insufficient intensities in the respective environments illustrated in FIG. 1A through FIG. 1C. FIG. 2A illustrates an example of a spectral distribution of illumination light in a sunlight environment. In a sunlight environment, the visible light 101 and the near-infrared light 102 both have sufficient intensities as illustrated in FIG. 1A, and it is not always necessary to cast visible light 201 and near-infrared light 202 as illumination light.

FIG. 2B illustrates an example of a spectral distribution of illumination light in a fluorescent-light environment. In a fluorescent-light environment, the visible light 111 has a sufficient intensity as illustrated in FIG. 1B, while the near-infrared light 112 has a low intensity. Thus, it is desirable to cast near-infrared light 212 as illumination light although it is not always necessary to cast visible light 211 as illumination light. FIG. 2C illustrates an example of a spectral distribution of illumination light in a dark place. In a dark place, as illustrated in FIG. 1C, the visible light 121 and the near-infrared light 122 both have very low intensities, and thus it is desirable to cast visible light 221 and near-infrared light 222 as illumination light.

While it is ideal to control illumination light in accordance with the spectral distribution of the external light when a biometric image is obtained by using an image capturing device, providing a mobile terminal device such as a tablet etc. with a measurement device that accurately measures the spectral distribution of external light increases the size and cost of the mobile terminal device. Therefore, a method of capturing a biometric image corresponding to all environments without providing such a measurement device is discussed.

For example, as illustrated in FIG. 2B, a biometric image corresponding to a fluorescent-light environment can be captured by casting only the near-infrared light 212 onto a living body. Also, as illustrated in FIG. 2C, a biometric image corresponding to a dark place can be captured by casting the visible light 221 and the near-infrared light 222 onto a living body.

Meanwhile, in the sunlight environment illustrated in FIG. 1A, the visible light 101 and the near-infrared light 102, which are external light, have intensities that are sufficiently higher than those of the visible light 221 and the near-infrared light 222, which are the illumination light corresponding to the dark place. Thus, even when the visible light 221 and the near-infrared light 222 are cast, a biometric image that is almost equivalent to one obtained when illumination light is not cast at all can be obtained. Accordingly, by casting the visible light 221 and the near-infrared light 222 onto a living body, it is possible to capture not only a biometric image corresponding to a dark place but also a biometric image corresponding to a sunlight environment.

As described above, by using both of the two types of illumination patterns illustrated in FIG. 2B and FIG. 2C, a biometric image corresponding to all environments can be captured without measuring a spectral distribution of external light.

FIG. 3 illustrates a functional configuration example of a biometric authentication apparatus. A biometric authentication apparatus 301 illustrated in FIG. 3 includes an obtainment unit 311, a reading unit 312, a calculation unit 313 and an authentication unit 314.

Figure 4:
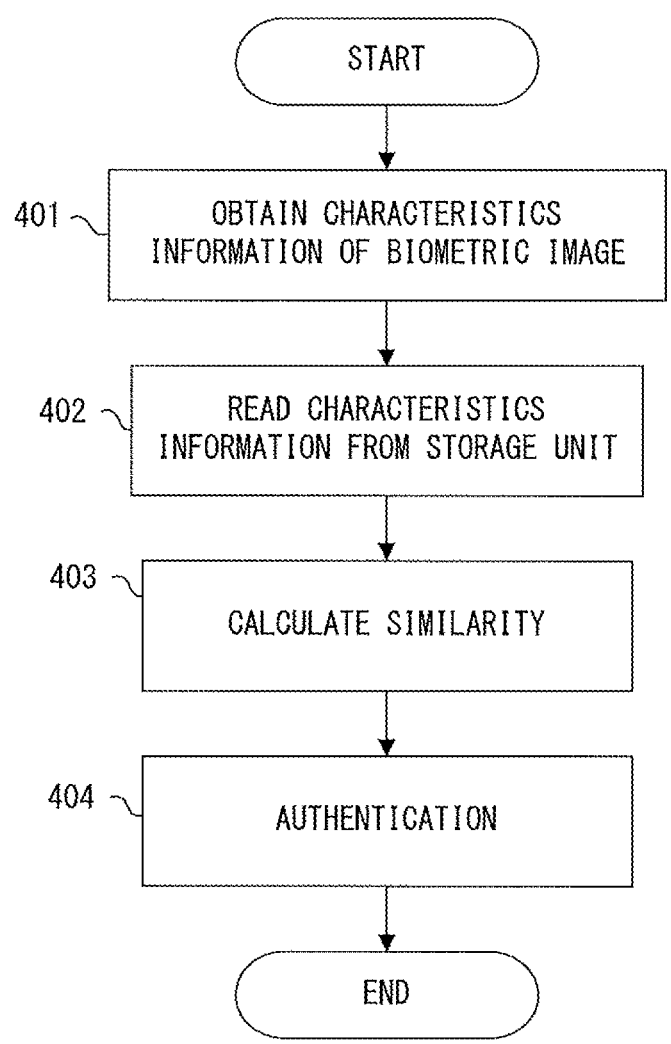
FIG. 4 is a flowchart illustrating a biometric authentication process.

FIG. 4 is a flowchart illustrating an example of a biometric authentication process performed by the biometric authentication apparatus 301 of FIG. 3. First, the obtainment unit 311 obtains characteristics information of a biometric image captured while casting the first illumination light or the second illumination light onto a living body that is an authentication target (step 401). The first illumination light contains light of the first wavelength, and the second illumination light contains light of the first wavelength and light of the second wavelength different from the first wavelength.

Next, the reading unit 312 reads characteristics information of a biometric image captured while casting the illumination light cast onto the living body that is the authentication target from a storage unit that stores the first characteristics information of the first biometric image and the second characteristics information of the second biometric image (step 402). The first biometric image is a biometric image captured while casting the first illumination light onto a living body that is a registration target, and a second biometric image is a biometric image captured while casting the second illumination light onto the living body that is the registration target.

The calculation unit 313 calculates the similarity between the obtained characteristics information and the characteristics information read by the reading unit 312 (step 403), and the authentication unit 314 performs authentication of the living body that is the authentication target on the basis of the similarity calculated by the calculation unit 313 (step 404).

The biometric authentication apparatus 301 as described above can increase the authentication accuracy in biometric authentication without depending upon an environment of external light.

Figure 5:
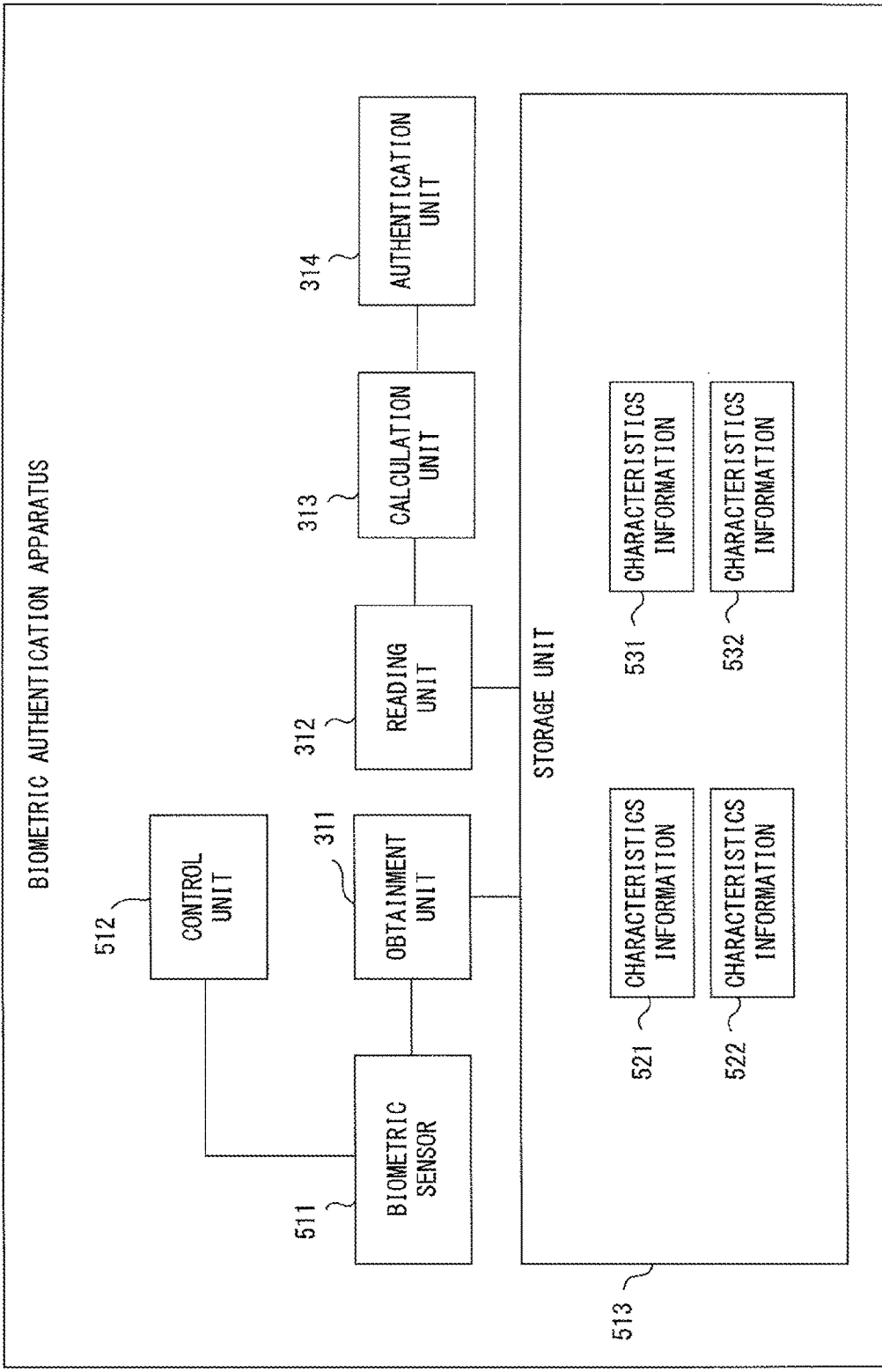
FIG. 5 is a functional configuration diagram illustrating a first specific example of the biometric authentication apparatus.

FIG. 5 illustrates a first specific example of the biometric authentication apparatus 301 illustrated in FIG. 3. A biometric authentication apparatus 501 illustrated in FIG. 5 includes the obtainment unit 311, the reading unit 312, the calculation unit 313, the authentication unit 314, a biometric sensor 511, a control unit 512 and a storage unit 513.

Figure 6:
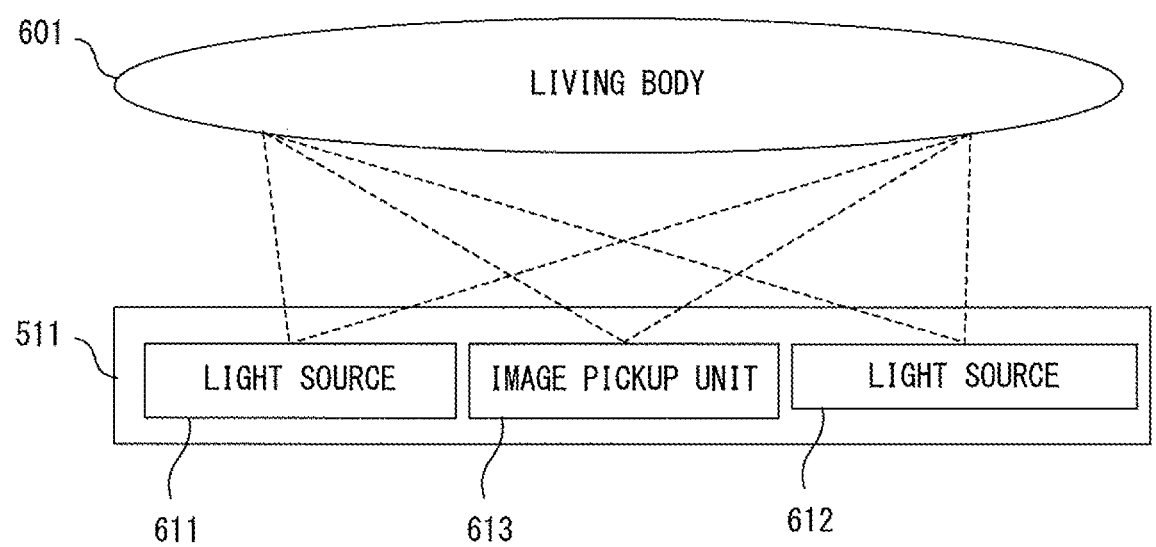
FIG. 6 is a configuration diagram of a biometric sensor.

FIG. 6 illustrates a configuration example of the biometric sensor 511 illustrated in FIG. 5. The biometric sensor 511 illustrated in FIG. 6 includes a light source 611, a light source 612 and an image pickup unit 613. The light source 611 and the light source 612 each include light emission units such as a Light-Emitting Diode (LED). The light source 611 radiates light in a long wavelength band including the first wavelength, and the light source 612 radiates light in a short wavelength band including the second wavelength that is different from the first wavelength. The image pickup unit 613 includes an image pickup element and captures an image of a living body 601 by receiving return light reflected by the living body 601 that is a registration target or an authentication target.

Incidentally, Japanese Patent Application No. 2015-062462, which is a prior application, describes a technique of observing veins highly accurately by sequentially casting light of a long wavelength of 700 nm or longer (red through near infra-red) and light of a short wavelength of 600 nm or shorter (blue through green) onto a living body and observing images of the respective wavelengths. In this technique, a filter having a different spectral transmission characteristic is provided to each pixel of the light receiving element of the camera.

When a vein is observed, light of a long wavelength is cast onto a palm and an image is captured via a long-wavelength filter having a high transmissivity for light of a long wavelength, and thereby an image including information of both wrinkles etc., which exist on the surface of the palm, and the vein pattern, which exists in subcutaneous tissues, is captured. Also, by casting light of a short wavelength onto the palm and capturing an image via a short-wavelength filter having a high transmissivity for light of a short wavelength, an image including only information of the surface of the palm is captured. Then, through a prescribed arithmetic operation using the two images, information of the surface of the palm is removed from the image captured by using the light of the long wavelength, and information of the vein pattern is extracted.

When the technique of the prior application as described above is applied to the biometric sensor 511 of FIG. 6, the light source 611 radiates light of a long wavelength of 700 nm or longer, and the light source 612 radiates light of a short wavelength of 600 nm or shorter. As light of a long wavelength, red visible light or near-infrared light for example may be used, and as light of a short wavelength, blue visible light or green visible light for example may be used. The image pickup unit 613 includes a plurality of filters having different spectral transmission characteristics and captures an image of the living body 601 via the filters. As the plurality of filters, for example a primary color filter such as an RGB filter, a complementary color filter such as a YMC filter, etc. may be used.

When the living body 601 is a registration target, the control unit 512 casts light radiated by the light source 611 onto the living body 601 as illumination light, and the image pickup unit 613 outputs pixel values to the obtainment unit 311. The obtainment unit 311 generates a biometric image by capturing the pixel values output from the image pickup unit 613, extracts characteristics information 521 from that biometric image, and stores the information in the storage unit 513.

Also, the control unit 512 casts light radiated from the light source 611 and the light source 612 onto the living body 601 as illumination light, and the image pickup unit 613 outputs pixel values to the obtainment unit 311. The obtainment unit 311 generates a biometric image by capturing the pixel values output from the image pickup unit 613, extracts characteristics information 522 from that biometric image, and stores the information in the storage unit 513. The storage unit 513 stores the characteristics information 521 and the characteristics information 522 as registration templates.

When the living body 601 is an authentication target, the control unit 512 casts light radiated by the light source 611 onto the living body 601 as illumination light, and the image pickup unit 613 outputs pixel values to the obtainment unit 311. The obtainment unit 311 generates a biometric image by capturing the pixel values output from the image pickup unit 613, extracts characteristics information 531 from that biometric image, and stores the information in the storage unit 513.

Also, the control unit 512 casts light radiated from the light source 611 and the light source 612 onto the living body 601 as illumination light, and the image pickup unit 613 outputs pixel values to the obtainment unit 311. The obtainment unit 311 generates a biometric image by capturing the pixel values output from the image pickup unit 613, extracts characteristics information 532 from that biometric image, and stores the information in the storage unit 513. The storage unit 513 stores the characteristics information 531 and the characteristics information 532 as characteristics information of an authentication-target living-body image.

The reading unit 312 reads the characteristics information of the authentication-target living-body image and the registration template, and the calculation unit 313 calculates the similarity between the characteristics information of the authentication-target living-body image and the registration template. In the above, the calculation unit 313 calculates the similarity between the characteristics information 531 and the characteristics information 521, the similarity between characteristics information 531 and the characteristics information 522, the similarity between the characteristics information 532 and the characteristics information 521, and the similarity between the characteristics information 532 and the characteristics information 522.

The authentication unit 314 compares for example the highest similarity from among the four similarities calculated by the calculation unit 313 with a threshold, determines whether the authentication of the living body 601 that is the authentication target has succeeded or failed, and outputs the determination result. When the similarity is higher than the threshold, a determination result indicating a successful authentication is output and when the similarity is lower than the threshold, a determination result indicating authentication failure is output.

Figure 7:
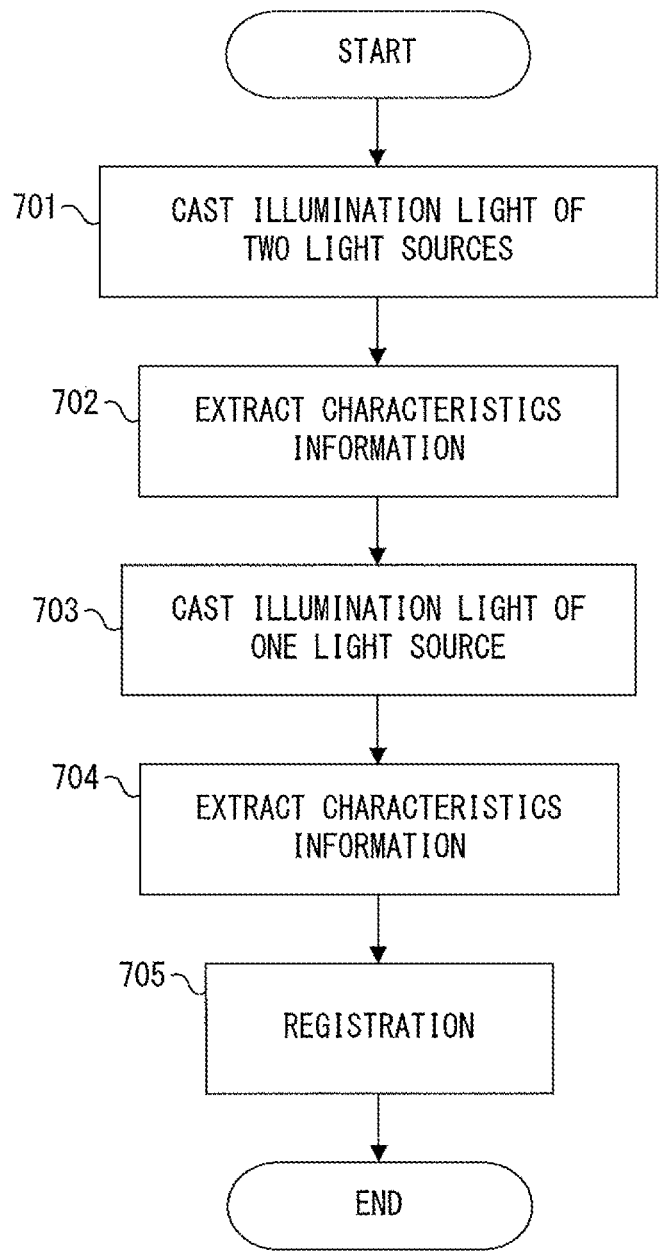
FIG. 7 is a flowchart of a registration process.

FIG. 7 is a flowchart illustrating an example of a registration process performed by the biometric authentication apparatus 501 illustrated in FIG. 5. First, the biometric sensor 511 turns on the light source 611 and the light source 612 and casts the illumination light of the light source 611 and the light source 612 onto the living body 601 (step 701). Then, the obtainment unit 311 generates a biometric image from the pixel values output from the biometric sensor 511 and extracts the characteristics information 522 from that biometric image (step 702).

Next, the biometric sensor 511 turns on the light source 611, turns off the light source 612, and casts the illumination light of the light source 611 onto the living body 601 (step 703). Then, the obtainment unit 311 generates a biometric image from the pixel values output from the biometric sensor 511 and extracts the characteristics information 521 from that biometric image (step 704). Next, the obtainment unit 311 registers the characteristics information 521 and the characteristics information 522 in the storage unit 513 (step 705).

In the registration process illustrated in FIG. 7, the order of performing the processes in step 701 and step 702 and the processes in step 703 and step 704 may be switched.

Figure 8:
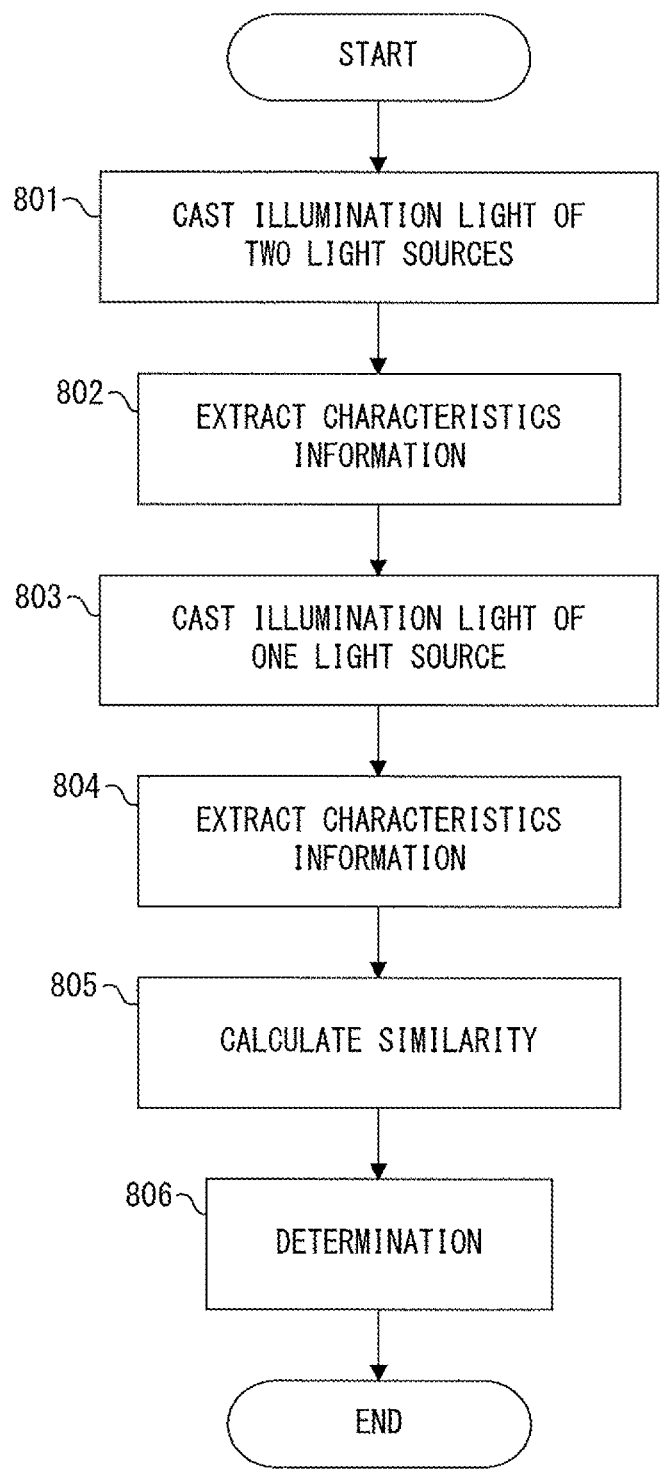
FIG. 8 is a flowchart illustrating a first specific example of a biometric authentication process.

FIG. 8 is a flowchart illustrating a first specific example of a biometric authentication process performed by the biometric authentication apparatus 501 illustrated in FIG. 5. First, the biometric sensor 511 turns on the light source 611 and the light source 612 and casts the illumination light of the light source 611 and the light source 612 onto the living body 601 (step 801). Then, the obtainment unit 311 generates a biometric image from the pixel values output from the biometric sensor 511 and extracts the characteristics information 532 from that biometric image (step 802).

Next, the biometric sensor 511 turns on the light source 611, turns off the light source 612 and casts the illumination light of the light source 611 onto the living body 601 (step 803). Then, the obtainment unit 311 generates a biometric image from the pixel values output from the biometric sensor 511 and extracts the characteristics information 531 from that biometric image (step 804).

Next, the calculation unit 313 calculates four similarities for four combinations between the characteristics information 531 and 532 and the characteristics information 521 and 522 (step 805). Then, the authentication unit 314 compares the highest similarity from among the four similarities with a threshold, determines whether the authentication of the living body 601 has succeeded or failed, and outputs the determination result (step 806).

In the biometric authentication process illustrated in FIG. 8, the order of performing the processes in step 801 and step 802 and the processes in step 803 and step 804 may be switched.

According to the biometric authentication apparatus 501 illustrated in FIG. 5, similarity is calculated for all combinations between the characteristics information of an authentication-target living-body image and the registration templates, and whether the authentication has succeeded or failed is determined on the basis of the highest similarity. This makes it possible to conduct authentication highly accurately even when the spectral distributions of the external light at the moment of performing a registration process and a biometric authentication process are not known.

Figure 9:
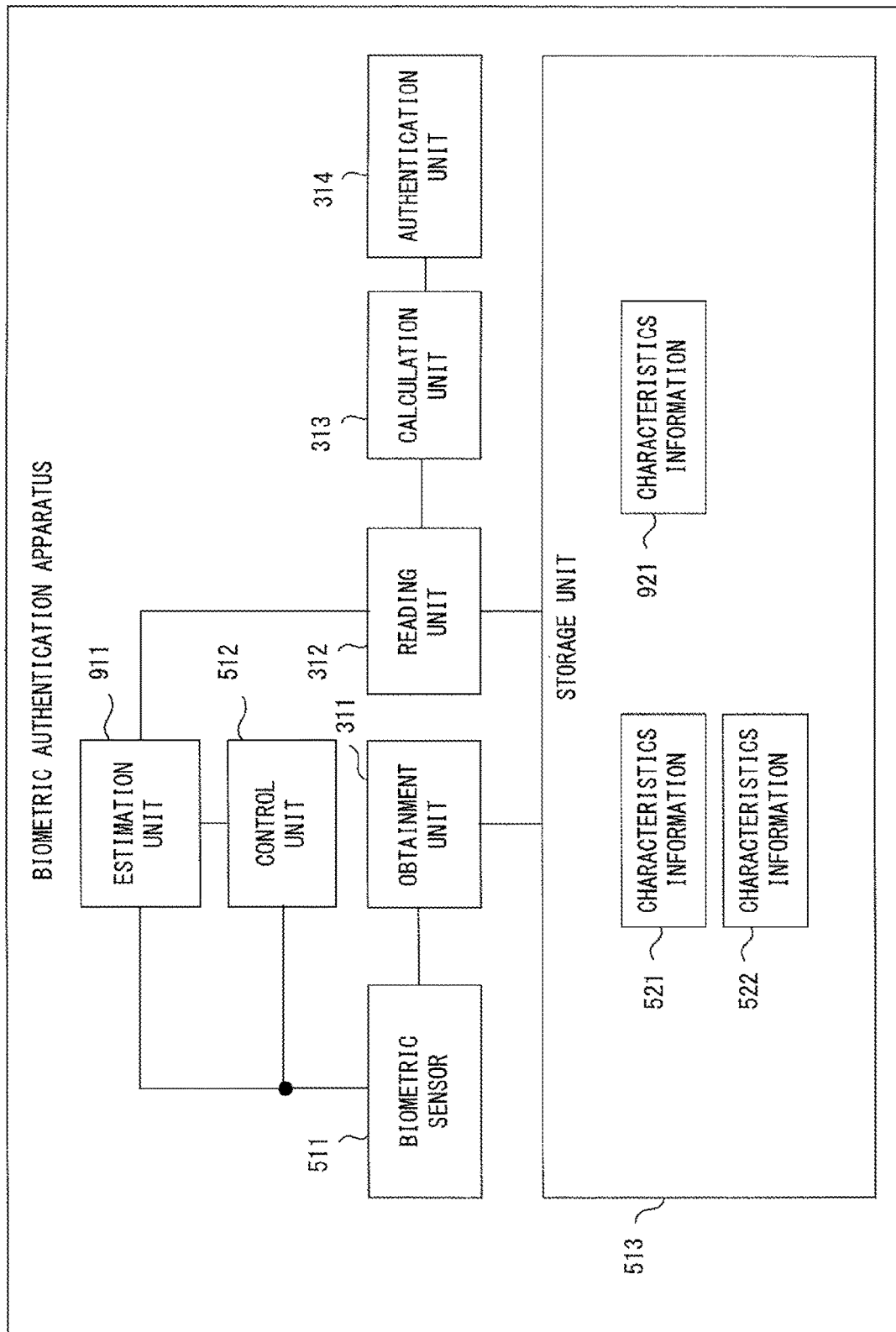
FIG. 9 is a functional configuration diagram illustrating a second specific example of the biometric authentication apparatus.

FIG. 9 illustrates a second specific example of the biometric authentication apparatus 301 illustrated in FIG. 3. A biometric authentication apparatus 901 illustrated in FIG. 9 has a configuration in which an estimation unit 911 is added to the biometric authentication apparatus 501 of FIG. 5. The registration process performed by the biometric authentication apparatus 901 is similar to that illustrated in FIG. 7.

In a biometric authentication process, the estimation unit 911 detects the brightness of an image of an image capturing region within the angle of view of the image pickup unit 613 by using the pixel values output from the biometric sensor 511 and estimates the spectral distribution in the image capturing region from the detected brightness. In such a case, the biometric sensor 511 may capture an image of the image capturing region in a state in which the light source 611 and the light source 612 are turned off and the image capturing region does not include the living body 601. Also, a pixel value output from the biometric sensor 511 may be a brightness value.

Although it is difficult to perform a spectroscopic analysis on external light only from the brightness of an image, the intensity of the external light can be detected from the brightness of the image and thus it is possible to estimate the tendency of the spectral distribution. For example, the intensity of external light under a sunlight environment ranges from several thousand lux through several tens of thousands lux, which is a very high intensity, while the intensity of external light in a fluorescent-light environment is on the order of several hundreds lux through 2000 lux. The higher the intensity of external light is, the brighter the image is, and thus, the spectral distribution of external light can be estimated by the following criteria.

(1) The image is very dark: dark place
(2) The image is somewhat bright: fluorescent-light environment
(3) The image is very bright: sunlight environment For example, the estimation unit 911 estimates the spectral distribution of the external light by using a first prescribed value and a second prescribed value which is greater than the first prescribed value. The estimation unit 911 estimates the place to be a dark place when the brightness of the image is lower than the first prescribed value, and estimates the place to be a fluorescent-light environment when the brightness of the image is higher than the first prescribed value and lower than second prescribed value. Also, the estimation unit 911 estimates the place to be a sunlight environment when the brightness of the image is higher than the second prescribed value. Then, the estimation unit 911 outputs the estimation result to the control unit 512 and the reading unit 312.

The control unit 512 selects illumination light on the basis of the estimation result output from the estimation unit 911 and casts the selected illumination light onto the living body

601. For example, the control unit 512 selects the illumination light of the light source 611 and the light source 612 when the estimation result indicates a dark place or a sunlight environment, and selects the illumination light only of the light source 611 when the estimation result indicates a fluorescent-light environment.

The biometric sensor 511 captures an image of the living body 601 while casting the selected illumination light, and the obtainment unit 311 generates a biometric image from the pixel values output from the biometric sensor 511, extracts characteristics information 921 from that biometric image, and stores the information in the storage unit 513. The storage unit 513 stores the characteristics information 921 as the characteristics information of the authentication-target living-body image.

The reading unit 312 reads the characteristics information 921 from the storage unit 513 and reads, from between the characteristics information 521 and the characteristics information 522, the characteristics information of a biometric image captured while casting the same illumination light as the illumination light selected by the control unit 512, on the basis of the estimation result output from the estimation unit 911. Accordingly, when the estimation result indicates a dark place or a sunlight environment, the reading unit 312 reads the characteristics information 522 of a biometric image captured while casting the illumination light of the light source 611 and the light source 612. Also, when the estimation result indicates a fluorescent-light environment, the reading unit 312 reads the characteristics information 521 of a biometric image captured while casting the illumination light only of the light source 611.

The calculation unit 313 calculates a similarity between the characteristics information 921 and the characteristics information that has been read after being selected from between the characteristics information 521 and the characteristics information 522. The authentication unit 314 compares the similarity calculated by the calculation unit 313 and a threshold and determines whether the authentication of the living body 601 has succeeded or failed.

Figure 10:
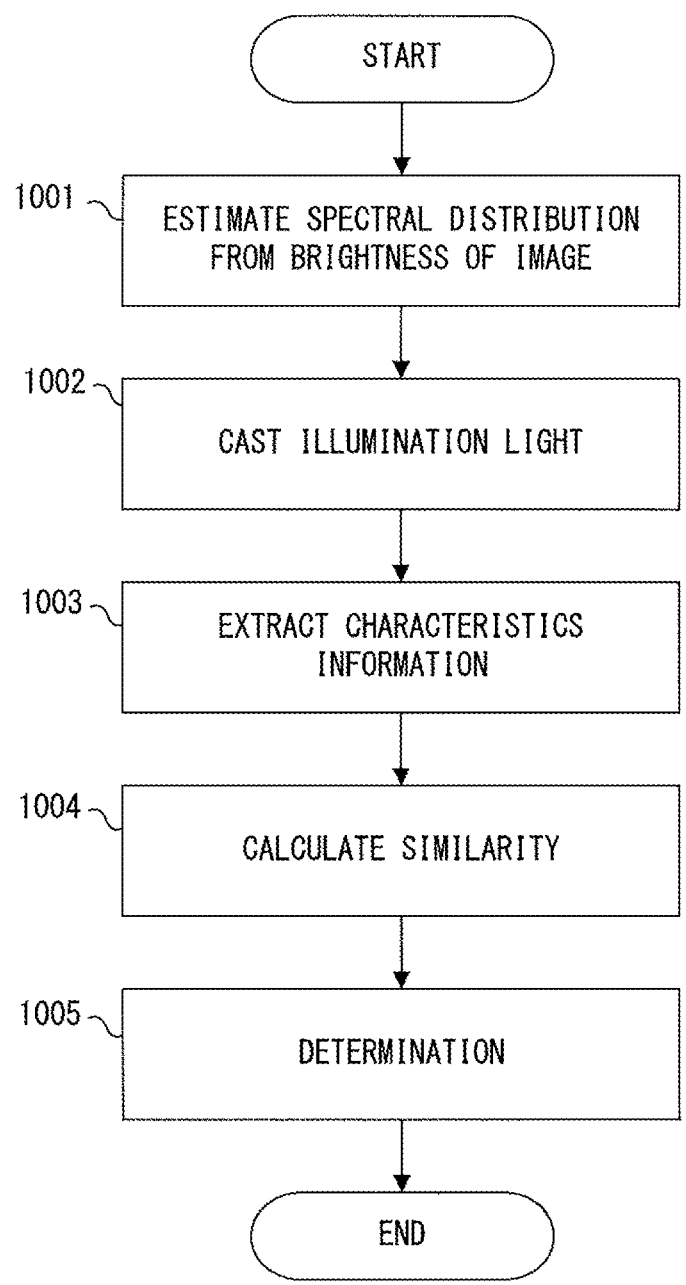
FIG. 10 is a flowchart illustrating a second specific example of the biometric authentication process.

FIG. 10 is a flowchart illustrating a second specific example of a biometric authentication process performed by the biometric authentication apparatus 901 illustrated in FIG. 9. First, the biometric sensor 511 turns off the light source 611 and the light source 612, and captures an image of an image capturing region, and the estimation unit 911 estimates the spectral distribution from the brightness of the image of the image capturing region (step 1001).

Next, the control unit 512 selects illumination light on the basis of the estimation result output from the estimation unit 911 and casts the selected illumination light onto the living body 601 (step 1002). Then, the obtainment unit 311 generates a biometric image from the pixel values output from the biometric sensor 511 and extracts the estimation unit 921 from that biometric image (step 1003).

Next, the calculation unit 313 calculates the similarity between the characteristics information 921 and the characteristics information 521 or the characteristics information 522 (step 1004). This calculation of similarity uses the characteristics information of a biometric image captured while casting the same illumination light as the illumination light selected, in step 1002, from between the characteristics information 521 and the characteristics information 522. Then, the authentication unit 314 compares the similarity and a threshold, determines whether the authentication of the living body 601 has succeeded or failed, and outputs the determination result (step 1005).

According to the biometric authentication apparatus 901 illustrated in FIG. 9, the spectral distribution of external light is estimated by using an image captured by the biometric sensor 511, the illumination light is determined on the basis of the estimation result, and a registration template is selected in accordance with the determined illumination light. This makes it possible to compare pieces of characteristics information that were obtained by using the same illumination light and thereby to perform authentication highly accurately. Further, the number of combinations between characteristics information of an authentication-target living-body image and registration templates is limited to one, and this leads to a reduction in the amount of calculation of similarity in comparison with that of the biometric authentication apparatus 501 illustrated in FIG. 5.

In step 1004 illustrated in FIG. 10, the calculation unit 313 may calculate two similarities: the similarity between the characteristics information 921 and the characteristics information 521 and the similarity between the characteristics information 921 and the characteristics information 522. In such a case, the reading unit 312 reads the characteristics information 921, the characteristics information 521 and the characteristics information 522 from the storage unit 513. Then, the calculation unit 313 calculates the similarity between the characteristics information 921 and the characteristics information 521 and the similarity between the characteristics information 921 and the characteristics information 522. In step 1005, the authentication unit 314 compares the similarity that is the higher between the two similarities and a threshold, determines whether the authentication of the living body 601 has succeeded or failed, and outputs the determination result.

According to a biometric authentication process as described above, a plurality of combinations between characteristics information of an authentication-target living-body image and registration templates are prepared, leading to higher authentication accuracy than in a case with one such combination. In a case when the external light environment at the moment when a registration process was performed is not known particularly, determination based on a plurality of combinations is effective.

Figure 11:
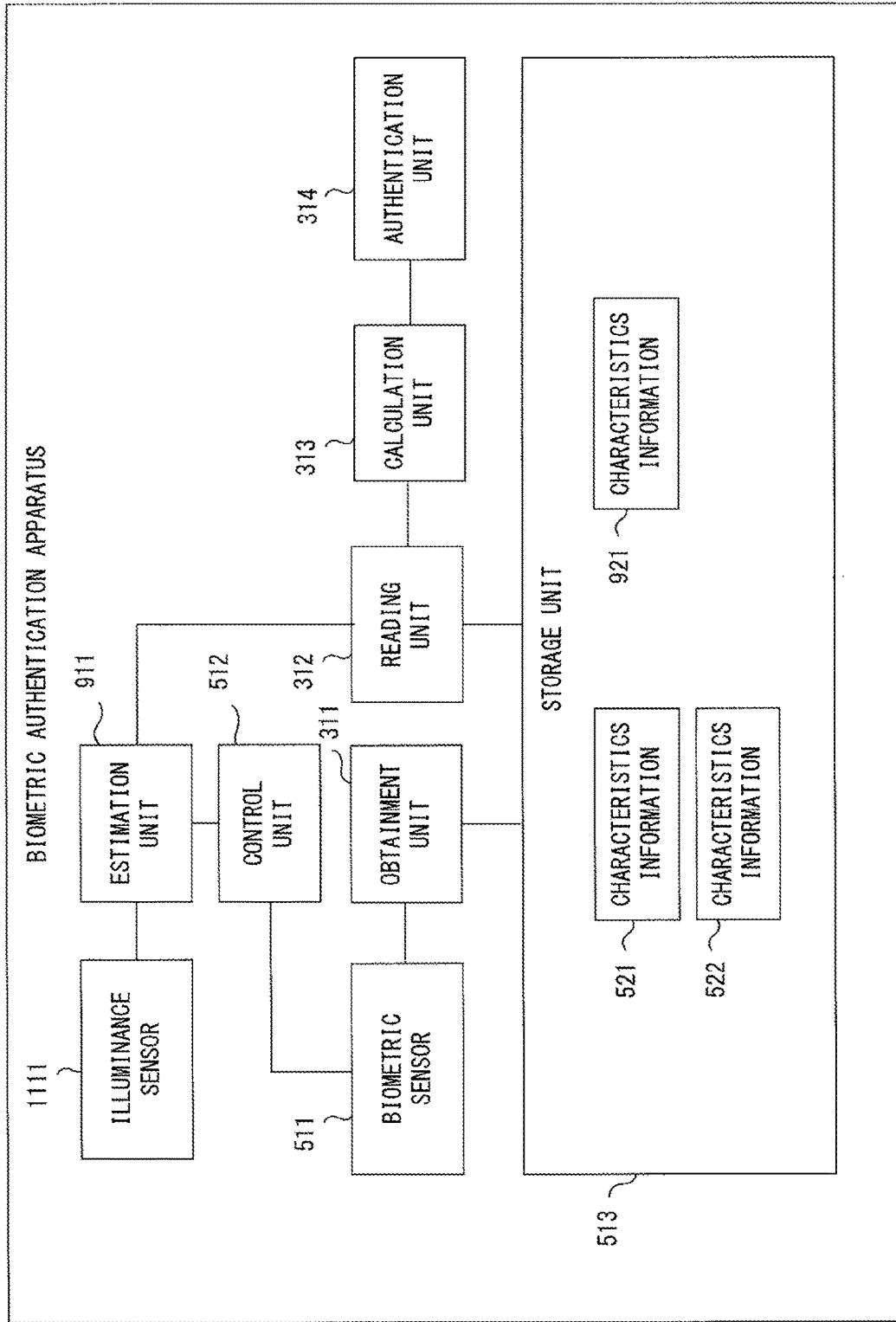
FIG. 11 is a functional configuration diagram illustrating a third specific example of the biometric authentication apparatus.

FIG. 11 illustrates a third specific example of the biometric authentication apparatus 301 illustrated in FIG. 3. A biometric authentication apparatus 1101 illustrated in FIG. 11 has a configuration in which an illuminance sensor 1111 is added to the biometric authentication apparatus 901 illustrated in FIG. 9. A registration process performed by the biometric authentication apparatus 1101 is similar to that illustrated in FIG. 7.

In a biometric authentication process, the illuminance sensor 1111 measures the brightness of an image capturing region in the angle of view of the image pickup unit 613 in a state in which the light source 611 and the light source 612 are turned off, and the estimation unit 911 estimates the spectral distribution in the image capturing region from the brightness measured by the illuminance sensor 1111. In such a case, the estimation unit 911 can estimate the spectral distribution of the external light on the basis of a criteria that is similar to that of the biometric authentication apparatus 901.

FIG. 12 is a flowchart illustrating a third specific example of a biometric authentication process performed by the biometric authentication apparatus 1101 illustrated in FIG. 11. First, the biometric sensor 511 turns off the light source 611 and the light source 612, the illuminance sensor 1111 measures the brightness of the image capturing region, and the estimation unit 911 estimates the spectral distribution from the brightness measured by the illuminance sensor 1111 (step 1201).

The processes in step 1202 through step 1205 are similar to those in step 1002 through 1005 illustrated in FIG. 10.

According to the biometric authentication apparatus 1101 illustrated in FIG. 11, the spectral distribution of external light is estimated on the basis of brightness measured by the illuminance sensor 1111, leading to a higher estimation accuracy than in a case when the spectral distribution is estimated by using a captured image. In particular, when the biometric authentication apparatus 1101 is a mobile terminal device provided with the illuminance sensor 1111, a spectral distribution can be estimated without newly adding the illuminance sensor 1111.

Similarly to step 1004 in FIG. 10, the calculation unit 313 in step 1204 in FIG. 12 can calculate two similarities: the similarity between the characteristics information 921 and the characteristics information 521 and the similarity between the characteristics information 921 and the characteristics information 522.

In the biometric authentication apparatus 901 illustrated in FIG. 9 or the biometric authentication apparatus 1101 illustrated in FIG. 11, it is also possible, when a registration process is performed, to estimate a spectral distribution in a method similar to a biometric authentication process and to register the estimation result together with the characteristics information 521 and the characteristics information 522 in the storage unit 513. In such a case, in a biometric authentication process, the reading unit 312 can compare a registered estimation result and the estimation result output from the estimation unit 911 and select a registration template to read, on the basis of the comparison result.

When for example a registered estimation result and the estimation result output from the estimation unit 911 indicate the same spectral distribution, the reading unit 312 reads only the characteristics information of the biometric image captured while casting the same illumination light as the illumination light selected by the control unit 512 from between the characteristics information 521 and the characteristics information 522. This makes it possible to minimize the amount of calculation of similarity without reducing the authentication accuracy.

When a registered estimation result and the estimation result output from the estimation unit 911 are different, the reading unit 312 reads both the characteristics information 521 and the characteristics information 522. This increases the authentication accuracy, although the amount of calculation of similarity increases.

The functions of the biometric authentication apparatus 501 illustrated in FIG. 5, the biometric authentication apparatus 901 illustrated in FIG. 9, and the biometric authentication apparatus 1101 illustrated in FIG. 11 can be implemented in a distributed manner by a plurality of devices that are connected via a communication network.

FIG. 13 illustrates a functional configuration example of a first biometric authentication system in which the functions of the biometric authentication apparatus 501 are distributed. The biometric authentication system of FIG. 13 includes a terminal device 1301 and a biometric authentication apparatus 1302. The terminal device 1301 may be a mobile terminal device, and the biometric authentication apparatus 1302 may be a server in a cloud.

The terminal device 1301 includes the biometric sensor 511, the control unit 512 and a communication unit 1311, and the biometric authentication apparatus 1302 includes the obtainment unit 311, the reading unit 312, the calculation unit 313, the authentication unit 314, the storage unit 513, and a communication unit 1321. The communication unit 1311 and the communication unit 1321 can communicate with each other via a communication network.

The biometric sensor 511 of the terminal device 1301 outputs pixel values to the communication unit 1311, and the communication unit 1311 transmits to the biometric authentication apparatus 1302 the pixel values output from the biometric sensor 511. The communication unit 1321 of the biometric authentication apparatus 1302 outputs to the obtainment unit 311 the pixel values received from the terminal device 1301.

Figure 14:
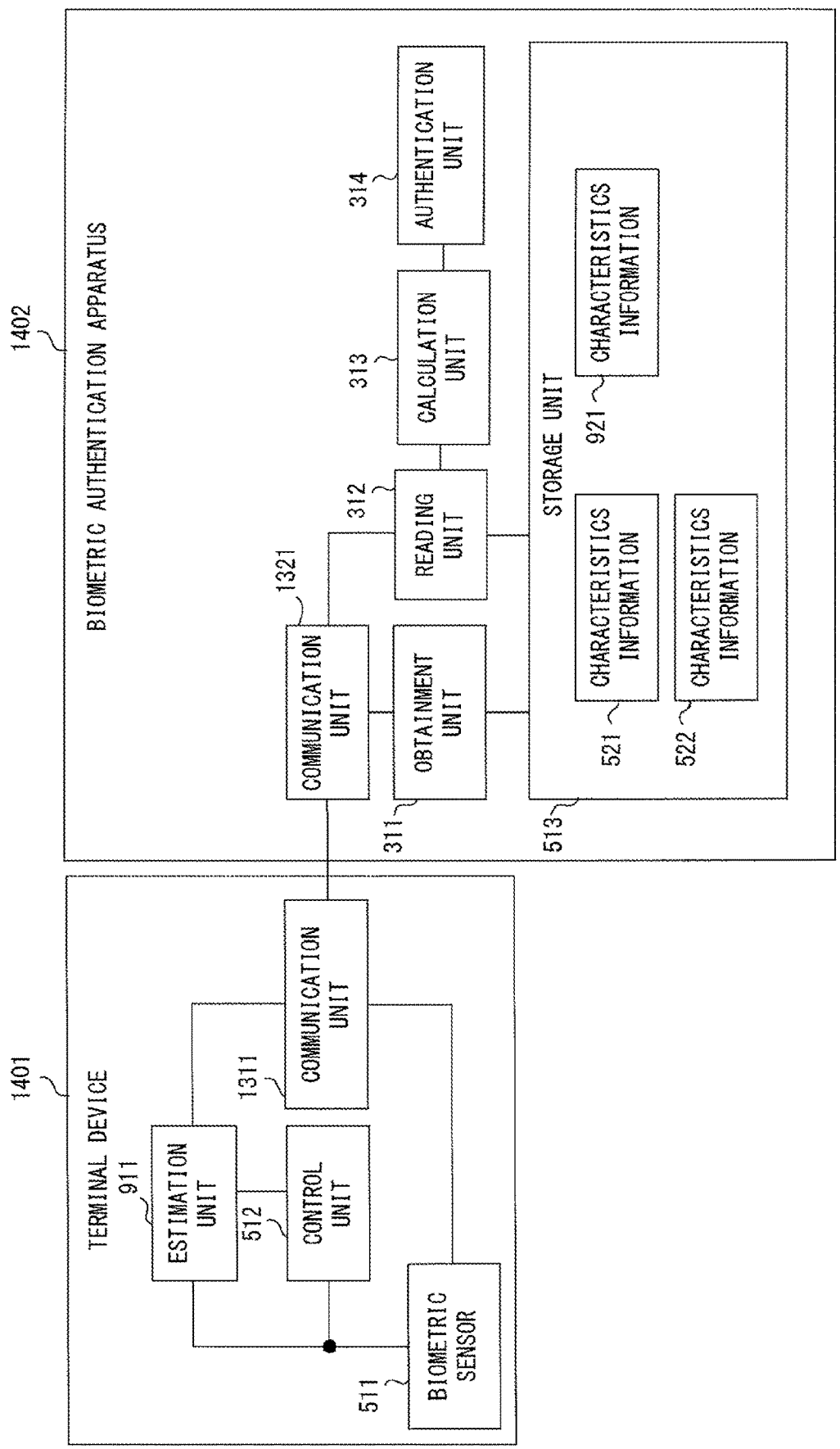
FIG. 14 is a functional configuration diagram of a second biometric authentication system.

FIG. 14 illustrates a functional configuration example of a second biometric authentication system in which the functions of the biometric authentication apparatus 901 are distributed. The biometric authentication system illustrated in FIG. 14 includes a terminal device 1401 and a biometric authentication apparatus 1402. The terminal device 1401 may be a mobile terminal device, and the biometric authentication apparatus 1402 may be a server in a cloud. The terminal device 1401 has a configuration in which the estimation unit 911 is added to the terminal device 1301 illustrated in FIG. 13.

The biometric sensor 511 of the terminal device 1401 outputs pixel values to the communication unit 1311, and the estimation unit 911 outputs an estimation result of a spectral distribution of external light to the communication unit 1311. The communication unit 1311 transmits, to the biometric authentication apparatus 1402, the pixel values output from the biometric sensor 511 and the estimation result output from the estimation unit 911. Then, the communication unit 1321 of the biometric authentication apparatus 1402 outputs, to the obtainment unit 311, the pixel values received from the terminal device 1401 and outputs the estimation result to the reading unit 312.

Figure 15:
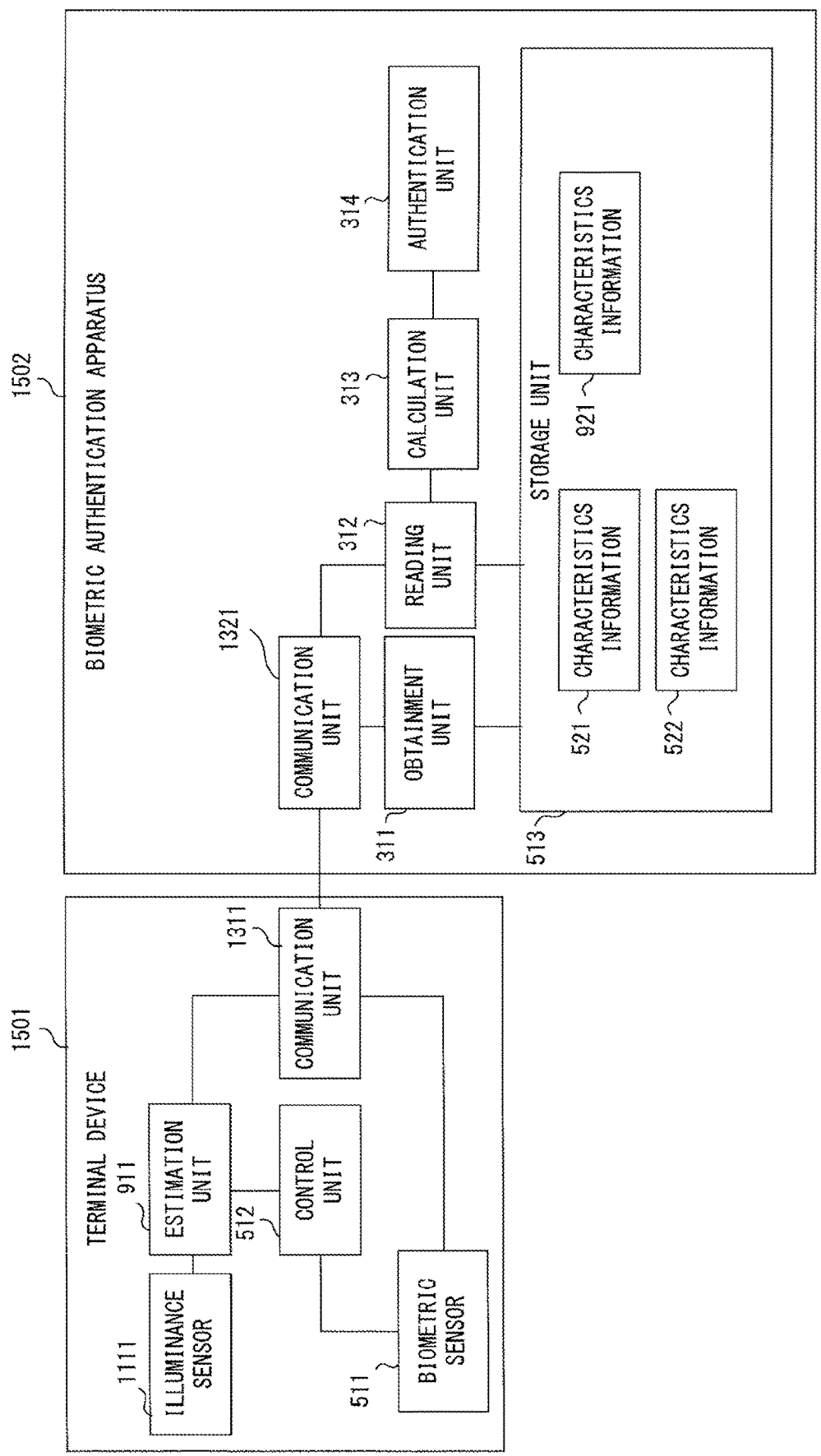
FIG. 15 is a functional configuration diagram of a third biometric authentication system.

FIG. 15 illustrates a functional configuration example of the third biometric authentication system in which the functions of the biometric authentication apparatus 1101 are distributed. The biometric authentication system illustrated in FIG. 15 includes a terminal device 1501 and a biometric authentication apparatus 1502. The terminal device 1501 may be a mobile terminal device, and the biometric authentication apparatus 1502 may be a server in a cloud. The terminal device 1501 has a configuration in which the illuminance sensor 1111 is added to the terminal device 1401 illustrated in FIG. 14.

The biometric sensor 511 of the terminal device 1501 outputs pixel values to the communication unit 1311, and the estimation unit 911 outputs an estimation result of a spectral distribution of external light to the communication unit 1311. The communication unit 1311 transmits, to the biometric authentication apparatus 1502, the pixel values output from the biometric sensor 511 and the estimation result output from the estimation unit 911. Then, the communication unit 1321 of the biometric authentication apparatus 1502 outputs, to the obtainment unit 311, the pixel values received from the terminal device 1501 and outputs the estimation result to the reading unit 312.

The configurations of the biometric authentication apparatus 301 illustrated in FIG. 3, the biometric authentication apparatus 501 illustrated in FIG. 5, the biometric authentication apparatus 901 illustrated in FIG. 9 and the biometric authentication apparatus 1101 illustrated in FIG. 11 are just exemplary, and some of the constituents may be omitted or changed in accordance with the purposes or conditions of the biometric authentication apparatuses. In the biometric authentication apparatus 501 illustrated in FIG. 5, the biometric authentication apparatus 901 illustrated in FIG. 9 and the biometric authentication apparatus 1101 illustrated in FIG. 11 for example, when the storage unit 513 is provided outside of the biometric authentication apparatuses, the storage unit 513 may be omitted.

The configuration of the biometric sensor 511 illustrated in FIG. 6 is just exemplary, and some of the constituents may be omitted or changed in accordance with the purposes or conditions of the biometric authentication apparatuses. For example, a light source that radiates light of a wavelength equal to or longer than a prescribed wavelength that is different from 700 nm may be used as the light source 611, and a light source that radiates light of a wavelength equal to or shorter than a prescribed wavelength that is different from 600 nm may be used as the light source 612. The biometric sensor 511 may include three or more light sources.

The configurations of the biometric authentication systems illustrated in FIG. 13 through FIG. 15 are just exemplary, and some of the constituents may be omitted or changed in accordance with the purposes or conditions of the biometric authentication systems. For example, in the biometric authentication systems illustrated in FIG. 13 through 15, the obtainment unit 311 may be provided in the terminal device so that obtained characteristics information is transmitted from the communication unit 1311 to the communication unit 1312. The obtainment unit 311, the reading unit 312, the calculation unit 313, the authentication unit 314 and the storage unit 513 may be provided in a plurality of devices in a distributed manner instead of being provided in a single device. In the biometric authentication systems illustrated in FIG. 14 and FIG. 15, the estimation unit 911 may be provided in the biometric authentication apparatus instead of being provided in the terminal device.

The flowcharts illustrated in FIG. 4, FIG. 7, FIG. 8, FIG. 10 and FIG. 12 are just exemplary, and some of the processes may be omitted or changed in accordance with the configurations or conditions of the biometric authentication apparatuses. For example, illumination light of three or more patterns may be used instead of using illumination light of the two patterns: the illumination light only of the light source 611 and the illumination light of the light source 611 and the light source 612. In step 1001 illustrated in FIG. 10 and step 1201 illustrated in FIG. 12, the estimation unit 911 may output an estimation result that indicates a spectral distribution that is not a dark place, a fluorescent-light environment, or a sunlight environment.

The spectral distributions illustrated in FIG. 1A through FIG. 1C and FIG. 2A through FIG. 2C are just exemplary, and spectral distributions of external light may vary in accordance with environments and spectral distributions of illumination light may vary in accordance with light sources.

FIG. 16 illustrates a configuration example of an information processing apparatus (computer) that is used as the biometric authentication apparatus 301 illustrated in FIG. 3, the biometric authentication apparatus 501 illustrated in FIG. 5, the biometric authentication apparatus 901 illustrated in FIG. 9, and the biometric authentication apparatus 1101 illustrated in FIG. 11. The information processing apparatus illustrated in FIG. 16 includes a Central Processing Unit (CPU) 1601, a memory 1602, an input device 1603, an output device 1604, an auxiliary storage device 1605, a medium driving device 1606, and a network connection device 1607. These constituents are connected to each other via a bus 1608. The biometric sensor 511 and the illuminance sensor 1111 may be connected to the bus 1608.

The memory 1602 is for example a semiconductor memory such as a Read Only Memory (ROM), a Random Access Memory (RAM), a flash memory, etc., and stores a program and data used for processes. The memory 1602 can be used as the storage unit 513.

The CPU 1601 (processor) executes a program by using for example the memory 1602 so as to operate as the obtainment unit 311, the reading unit 312, the calculation unit 313, the authentication unit 314, the control unit 512, and the estimation unit 911.

The input device 1603 is for example a keyboard, a pointing device, etc., and is used for inputting instructions or information from an operator or a user. The output device 1604 is for example a display device, a printer, a speaker, etc., and is used for outputting inquiries to the operator or the user or for outputting process results. The process results may be a determination result that indicates whether authentication has succeeded or failed.

The auxiliary storage device 1605 is for example a magnetic disk device, an optical disk device, a magneto-optical disk device, a tape device, etc. The auxiliary storage device 1605 may be a flash memory or a hard disk drive. The information processing apparatus can store a program and data in the auxiliary storage device 1605 beforehand so as to load them onto the memory 1602 and use them. The auxiliary storage device 1605 can be used as the storage unit 513.

The medium driving device 1606 drives a portable recording medium 1609 so as to access information recorded in it. The portable recording medium 1609 is a memory device, a flexible disk, an optical disk, a magneto-optical disk, etc. The portable recording medium 1609 may be a Compact Disk Read Only Memory (CD-ROM), a Digital Versatile Disk (DVD), a Universal Serial Bus (USB) memory, etc. The operator or the user can store a program and data in the portable recording medium 1609 so as to load them onto the memory 1602 and use them.

As described above, a computer-readable recording medium that stores a program and data used for processes is a physical (non-transitory) recording medium such as the memory 1602, the auxiliary storage device 1605, or the portable recording medium 1609.

The network connection device 1607 is a communication interface that is connected to a communication network such as a Local Area Network, a Wide Area Network, etc. so as to perform data conversion that accompanies communications. The information processing apparatus can receive a program and data from an external device via the network connection device 1607 and load them onto the memory 1602 and use them.

Note that it is not necessary for the information processing apparatuses to include all the constituents illustrated in FIG. 16, and some of the constituents can be omitted in accordance with the purposes or conditions. For example, when it is not necessary to input instructions or information from the operator or the user, the input device 1603 can be omitted. When the portable recording medium 1609 or a communication network is not used, the medium driving device 1606 or the network connection device 1607 can be omitted.

As the terminal device 1301 and the biometric authentication apparatus 1302 illustrated in FIG. 13, the terminal device 1401 and the biometric authentication apparatus 1402 illustrated in FIG. 14, and the terminal device 1501 and the biometric authentication apparatus 1502 illustrated in FIG. 15, an information processing apparatus similar to that illustrated in FIG. 16 may be used. In such a case, the network connection device 1607 may be used as the communication unit 1311 or the communication unit 1321.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric authentication apparatus comprising:
   a memory configured to store first characteristics information of a first biometric image captured while casting first illumination light including light of a first wavelength onto a living body that is a registration target and second characteristics information of a second biometric image captured while casting second illumination light including light of the first wavelength and light of a second wavelength different from the first wavelength onto the living body that is the registration target, wherein the first illumination light is output from a first light source and the second illumination light is output from a second light source; and
   a processor coupled to the memory and configured to
      obtain characteristics information of a biometric image captured while casting the first illumination light or the second illumination light onto a living body that is an authentication target,
      read characteristics information of a biometric image captured while casting illumination light cast onto the living body that is the authentication target from the memory,
      calculate a similarity between the obtained characteristics information and the characteristics information read from the memory, and
      conduct authentication of the living body that is the authentication target on the basis of the similarity.

2. The biometric authentication apparatus according to claim 1, wherein
   the obtained characteristics information includes characteristics information of a first authentication-target living-body image captured while casting the first illumination light onto the living body that is the authentication target and characteristics information of a second authentication-target living-body image captured while casting the second illumination light onto the living body that is the authentication target,
   the processor reads the first characteristics information and the second characteristics information from the memory, and
   the similarity includes a first similarity between the characteristics information of the first authentication-target living-body image and the first characteristics information, a second similarity between the characteristics information of the first authentication-target living-body image and the second characteristics information, a third similarity between the characteristics information of the second authentication-target living-body image and the first characteristics information, and a fourth similarity between the characteristics information of the second authentication-target living-body image and the second characteristics information.

3. The biometric authentication apparatus according to claim 1, wherein
   the processor estimates a spectral distribution of an image capturing region, and
   the biometric image of the living body that is the authentication target is a biometric image captured while casting, onto the living body that is the authentication target, illumination light selected from between the first illumination light and the second illumination light on the basis of the spectral distribution estimated by the processor.

4. The biometric authentication apparatus according to claim 3, wherein
   the processor reads the first characteristics information and the second characteristics information from the memory, and
   the similarity includes a first similarity between the obtained characteristics information and the first characteristics information and a second similarity between the obtained characteristics information and the second characteristics information.

5. The biometric authentication apparatus according to claim 3, wherein
   the image capturing region is a region that is within an angle of view of a camera that captures the biometric image of the living body that is the authentication target,
   the processor estimates the spectral distribution from a brightness of the image capturing region captured by the camera, and
   the second illumination light is selected when the brightness is lower than a prescribed value, and the first illumination light is selected when the brightness is higher than the prescribed value.

6. The biometric authentication apparatus according to claim 3, wherein
   the image capturing region is a region that is within an angle of view of a camera that captures the biometric image of the living body that is the authentication target,
   the processor estimates the spectral distribution from a brightness of the image capturing region measured by an illuminance sensor, and
   the second illumination light is selected when the brightness is lower than a prescribed value, and the first illumination light is selected when the brightness is higher than the prescribed value.

7. A biometric authentication system comprising:
   a first light source configured to output first illumination light including light of a first wavelength;
   a second light source configured to output second illumination light including light of the first wavelength and light of a second wavelength different from the first wavelength;
   a camera configured to capture an image of a living body;
   a memory configured to store first characteristics information of a first biometric image captured while casting the first illumination light onto a living body that is a registration target and second characteristics information of a second biometric image captured while casting the second illumination light onto the living body that is the registration target; and
   a processor configured to obtain characteristics information of a biometric image captured while casting the first illumination light or the second illumination light onto a living body that is an authentication target, to read, from the memory, characteristics information of a biometric image captured while casting illumination light cast onto the living body that is the authentication target, to calculate a similarity between the obtained characteristics information and the characteristics information read from the memory, and to conduct authentication of the living body that is the authentication target on the basis of the similarity.

8. The biometric authentication system according to claim 7, wherein the obtained characteristics information includes characteristics information of a first authentication-target living-body image captured while casting the first illumination light onto the living body that is the authentication target and characteristics information of a second authentication-target living-body image captured while casting the second illumination light onto the living body that is the authentication target, the processor reads the first characteristics information and the second characteristics information from the memory, and the similarity includes a first similarity between the characteristics information of the first authentication-target living-body image and the first characteristics information, a second similarity between the characteristics information of the first authentication-target living-body image and the second characteristics information, a third similarity between the characteristics information of the second authentication-target living-body image and the first characteristics information, and a fourth similarity between the characteristics information of the second authentication-target living-body image and the second characteristics information.

9. The biometric authentication system according to claim 7, wherein the processor estimates a spectral distribution of an image capturing region, and the biometric image of the living body that is the authentication target is a biometric image captured while casting, onto the living body that is the authentication target, illumination light selected from between the first illumination light and the second illumination light on the basis of the spectral distribution estimated by the processor.

10. A non-transitory computer-readable recording medium having stored therein a biometric authentication program causing a computer to execute a process comprising:

obtaining characteristics information of a biometric image captured while casting first illumination light including light of a first wavelength or second illumination light including light of the first wavelength and light of a second wavelength different from the first wavelength onto a living body that is an authentication target, wherein the first illumination light is output from a first light source and the second illumination light is output from a second light source;

reading characteristics information of a biometric image captured while casting illumination light cast onto the living body that is the authentication target from a memory that stores first characteristics information of a first biometric image captured while casting the first illumination light onto a living body that is a registration target and second characteristics information of a second biometric image captured while casting the second illumination light onto the living body that is the registration target;

calculating a similarity between the obtained characteristics information and the characteristics information read from the memory; and conducting authentication of the living body that is the authentication target on the basis of the similarity.

11. The non-transitory computer-readable recording medium according to claim 10, wherein the obtained characteristics information includes characteristics information of a first authentication-target living-body image captured while casting the first illumination light onto the living body that is the authentication target and characteristics information of a second authentication-target living-body image captured while casting the second illumination light onto the living body that is the authentication target, the reading the characteristics information of the biometric image reads the first characteristics information and the second characteristics information from the memory, and the similarity includes a first similarity between the characteristics information of the first authentication-target living-body image and the first characteristics information, a second similarity between the characteristics information of the first authentication-target living-body image and the second characteristics information, a third similarity between the characteristics information of the second authentication-target living-body image and the first characteristics information, and a fourth similarity between the characteristics information of the second authentication-target living-body image and the second characteristics information.

12. The non-transitory computer-readable recording medium according to claim 10, wherein the process further comprises estimating a spectral distribution of an image capturing region, and the biometric image of the living body that is the authentication target is a biometric image captured while casting, onto the living body that is the authentication target, illumination light selected from between the first illumination light and the second illumination light on the basis of the spectral distribution that was estimated.

* * * * *